April 1, 1969     E. J. DI NOIA     3,436,713
CRYOGENIC RESISTANCE TEMPERATURE DETECTOR
Filed Nov. 2, 1966
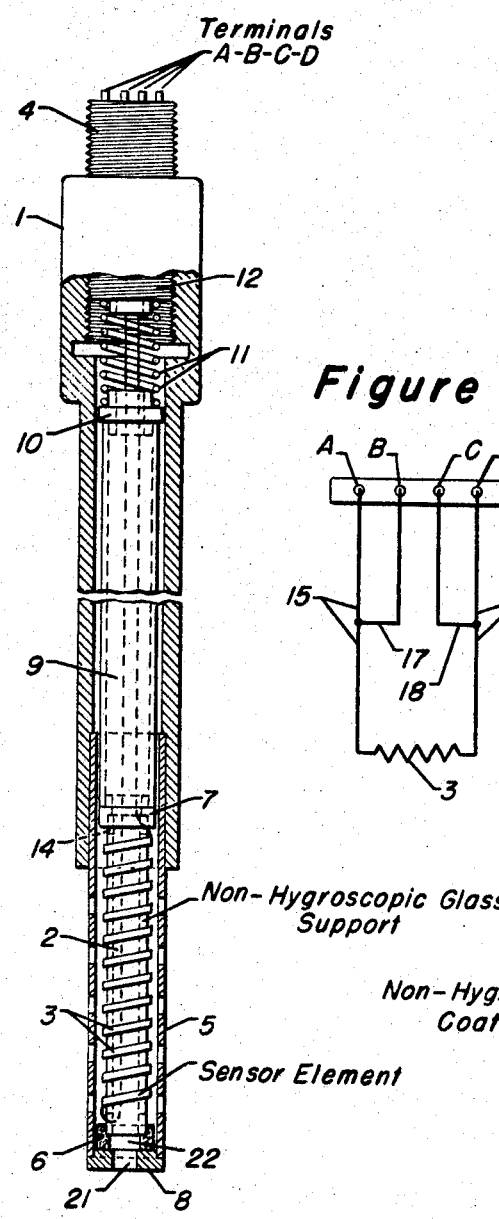
INVENTOR:
Emanuel J. DiNoia
BY: James R. Hoatson, Jr.
Philip J. Liggett
ATTORNEYS

United States Patent Office 3,436,713
Patented Apr. 1, 1969

3,436,713
CRYOGENIC RESISTANCE TEMPERATURE DETECTOR
Emanuel J. Di Noia, Briarcliff Manor, N.Y., assignor to Universal Oil Products Company, Des Plaines, Ill., a corporation of Delaware
Filed Nov. 2, 1966, Ser. No. 591,613
Int. Cl. H01c 7/00
U.S. Cl. 338—28               5 Claims

ABSTRACT OF THE DISCLOSURE

A cryogenic resistance temperature detector adapted to be immersed in cryogenic fluids comprising a hollow thermo-resistant smooth glass support and a resistance element which is held to the support by a coating capable of providing a resultant crystalline non-hygroscopic covering having a coefficient of expansion equivalent to the support and resistance element, and high strength.

---

The present invention is directed to a cryogenic resistance temperature detector and more particularly to a special form of detector which is adapted to be immersed directly into low temperature cryogenic fluids.

Many of the usual forms of resistance coil temperature detectors utilize thermowells fully enclosing the resistance coil such that there is no direct contact with a fluid or vapor. Conventional forms of detector units also utilize support members for the sensor elements which are of a ceramic like material and thus subject to certain problems which are associated with hygroscopic materials. For example, ceramic materials when immersed in a liquid will "short-out" the sensor coil and not operate properly. Also, in connection with extreme low temperature cryogenic service, it is not practicable or possible to use a porous hygroscopic non-conductor support since there can be a break down of the support member itself from the freezing action of fluid materials within the pores of such member.

In order to hold a sensor or detector coil in position it is also quite conventional to utilize lateral or spiral groove means on the support member; however, it has been found that such positioning grooves can lead to resulting voltage outputs which are erroneous because of a "strain gage" effect during differential movement from temperature expansions and contractions.

It may thus be considered a principal object of the present invention to provide a resistance coil temperature detector construction which utilizes a smooth non-hygroscopic support member for the resistance coil so as to preclude problems from the shorting-out of the sensor coil as well as preclude support break down under low temperature cryogenic conditions.

It may also be considered an object of the present invention to provide a support construction eliminating the use of guide grooves for the sensor coil while at the same time utilizing a material having a similar coefficient of expansion with the metal resistance coil itself so as to preclude any "strain gage" type of errors in performance.

In order to accomplish the present invention, it has been found possible to utilize a temperature resistant, non-hygroscopic, refractory form of glass support member with a coefficient of expansion equivalent to the metal of the sensor unit and, at the same time, hold the sensor element or coil in position on the support member by a suitable coating material capable of hardening into a substantially polycrystalline structure that is also non-hygroscopic in nature. Preferably noble metal wire sensor coils are used, and in particular platinum, while the glass is preferably of the heat resistant, refractory Pyrex type.

Broadly, the present invention provides in connection with a temperature detector of the electrical resistance type an improved construction for low temperature service, which comprises, utilizing a non-conductive resistance element support member that is a non-porous glass type rod having a coefficient of expansion equal to the resistance element, and effecting a mounting of the resistance element to the glass-type rod support member with an overlay of a glass-type coating material providing a resulting substantially devitrified, crystalline and non-hygroscopic covering with a coefficient of expansion compatible with the support member and with the resistance element thereon.

Although various types or forms of noble metal ribbons or wires may be utilized in connection with resistance coil temperature detectors, a preferred design and construction, such as embodied in the present invention, makes use of a platinum ribbon detector element which is particularly sensitive. Also with a platinum ribbon, there can be provided a resulting coefficient of expansion in the .00000890 per degree centigrade range, substantially equivalent to a hard, refractory glass support member for holding the detector element in a coated and fixed position. In any event, the resistance coil or sensor element, whether of platinum or part platinum with some other noble metal, shall be chosen along with the glass support material such that there is a substantial equivalence in coefficient of expansion over the cryogenic temperature range to be encountered. In addition, the glass cement material being placed over the resistance coil and the glass support rod or tube shall have a resulting coefficient of expansion substantially equivalent to the sensor element and the support rod, whereby the finished unit will withstand wide variations in temperature while at the same time substantially eliminating any voltage outputs from a "strain gage" effect. It has been found that a polycrystalline glass, such as a "Pyroceram" cement product of the Corning Glass Company, provides a suitable coating material to embed the sensor element onto the support member. Such cement coating comprises a mixture of finely powdered refractory glass held in a suitable organic binder and vehicle such that it may be applied in a viscous and plastic condition, but sets after exposure to the air and heating. The vehicle shall be one that can be burned away and provide a sealing layer. Actually, after a heating and sealing of the coating material over the sensor element, there shall be a sufficiently high temperature heating for a period of time to effect devitrification and such that there is a resulting substantially devitrified crystalline type of dense hard glass which is equivalent in strength to the support material itself. The organic viscous vehicle for the Pyroceram coating may, for example, comprise a nitro-cellulose and amyl acetate mixture. Further, it is to be noted that the resulting resistance coil mounting on the glass support member together with the coating which has been devitrified and stress relieved will result in a non-hygroscopic structure suitable for use with cryogenic fluids. In other words there are none of the disadvantages found in the construction of sensor elements having a hygroscopic ceramic type of support member.

It may also be noted that in a preferred construction, utilizing platinum ribbon for the sensor element, that there also shall be made use of platinum ribbons for connecting the sensor grid itself to the terminals or connector pins of the mounting body of the unit so as to minimize any thermoelectric potential of the resistance temperature detector.

Reference to the accompanying drawing and the following description thereof will serve to illustrate the design and arrangement of one embodiment of the improved resistance temperature detector unit suitable for use with cryogenic fluids, as well as point out additional advantageous features in connection therewith.

FIGURE 1 of the drawing is an elevational view, partially in section, showing the use of a non-hygroscopic tube member for supporting the noble metal sensor element.

FIGURE 2 of the drawing is a partial sectional view of the detector unit showing the resulting devitrified glass type coating material over the sensor element which is in turn mounted over and supported by a non-hygroscopic glass tubular member within a protective housing member.

FIGURE 3 of the drawing merely indicates diagrammatically a wiring diagram for the unit, with the sensor element being connected to a four pin electrical connector on the mounting stem or main body of the unit.

Referring now particularly to FIGURE 1 of the drawing, there is indicated a main body member 1 which is normally of metal and has a hollow construction adapted to hold internally at one end thereof a resistance coil support member 2 and the resistance element itself 3. There is also provision for externally supporting an electrical connector means 4 with internal terminal means. The electrical connector end of the unit is indicated diagrammatically as being externally threaded whereby other electrical connector means may effect a suitable electrical juncture with the terminals A, B, C and D therein. In the present embodiment, the hollow main body member 1 has an elongated perforate cover or housing section 5 for its internal end portion in order to surround the sensor element 3. Thus, the latter is protected from damage as it is inserted or withdrawn from a particular reactor or other zone where the unit is to be subjected to cryogenic conditions.

Various methods may be provided for connecting or otherwise holding the non-hygroscopic glass type of resistance coil support member within the main body 1 of the detector unit; however, a preferred arrangement permits assembly in a manner to provide longitudinal adjustment of the internal members as well as a proper centering of such internal members within the outer housing. In this instance, there is shown a lower cap member 6 and an intermediate cap member 7 at each end of the glass support tube member 2 with an external cap member 8 being utilized at the end of the housing 5 to hold the entire assembly within the main body and housing sections. Each of the end cap members 6 and 8 are indicated as having a central opening whereby the cryogenic fluid may enter the lower end of the housing unit to provide rapid temperature sensing for the coil 3 mounted on the support member 2. The intermediate cap member 7 abuts or connects with one end of an internally positioned spacer tube 9 which is held concentrically within the main body section 1 and below a spacer cap member 10. The latter is movable between the outermost end of spacer tube 9 and a compression spring 11. The latter in turn abuts a movably adjustable threaded member 12 that engages internal thread means within the main body section 1. All of the internal members, including the spacer tube 9, the cap members 7 and 10, and the adjustment member 12 for spring 11 have internal passageways or openings whereby the ends of the sensor element 3 can have lead wires or connector ribbons carry on upwardly to the terminals of the detector unit. Such connector ribbons or wires shall of course be properly welded or otherwise attached to the terminals and, although not shown, there shall be a suitable sealing material used around wires and the terminals at the external portion of the electrical connector, whereby the hollow internal portion of the main body member 1 and internal elements will have a pressure tight seal from the exterior.

As best shown in FIGURE 2 of the drawing, there is indicated a construction providing slotted means within the support member 2 by way of opening means 13 at the lower or most internal end portion thereof and opening means 14 at the upper or most interior end thereof whereby the connecting ribbons from the sensor element 3 may carry upwardly through the spacer tube 9. The connector ribbons, shown respectively as 15 and 16, are positioned internally within the intermediate cap member 7 and spacer tube 9 whereby they may carry on through the interior of the body section 1 to the terminals in the electrical connector section 4.

In FIGURE 3 of the drawing, there is indicated diagrammatically that the connector ribbons or lead wires 15 and 16 have respectively branch connector ribbons or wires 17 and 18, whereby there may be a connection of such leads to a four pin or four terminal connector. The four terminals are indicated respectively as A, B, C and D.

Again referring to FIGURE 2 of the drawing, there is also indicated diagrammatically the placement of a glass type cement coating 19 over the sensor element 3 and the glass support tube member 2. As hereinbefore indicated, this glass cement coating shall be of a Pyroceram type that is compatible with the sensor element 3 and the support member 4 such that in its finally dried, heated and annealed state there will be no problems of differential expansion with the sensor coil or with the tubular support member to permit cracking or breaking away under the low temperature cryogenic conditions or with the changing from hot to cold conditions. Generally, the cement coating is air dried and then heated slowly to the 800° F. range so as to obtain a devitrified polycrystalline structure. The perforate detector cover portion, or housing 5, is provided with a plurality of openings 20 which readily permit the passage of the cryogenic fluid externally over the coating 19 and the embedded coil 3. At the same time, the opening 21 in cap member 8 and the opening 22 in cap 6 permit a rapid internal circulation of cryogenic fluids to the interior of the support tube 2.

It is not intended to limit the present invention to any one method of holding the non-hygroscopic glass type coil support member within the end portion of a main body detector unit or within a housing section, nor to any one brand of Pyroceram coating material. However, in all instances and in accordance with the improved construction of this invention, there shall be a glass-type support member to withstand the extreme low temperature conditions of a contacting cryogenic fluid and to have a non-hygroscopic material which will eliminate all porosity which can lead to the shorting-out of the sensor coil. Preferably the main body and housing section will be of high temperature resistant stainless steel construction with the assembly of portions of the body sections being accomplished by welding, or otherwise, to provide a strong non-porous body and housing section which is readily mountable for operating conditions.

In the actual construction and assembly of the preferred form of the sensor coil section of the unit, a Pyroceram cement shall provide an adequate coating to cover all of the sensor coil itself and make a tight bonding onto the support tube member 2. Subsequently, there shall be a suitable sealing, devitrifying and stress relieving heating operation at a temperature of the order of 900° F. such that the entire coated section will result in a crystalline coating non-hygroscopic in nature, as well as effect a stress relieving to preclude any later thermoelectric or "strain gage" effects between the metal sensing coil and and the supporting or encompassing glass-type materials.

I claim as my invention:

1. In a temperature detector of the electrical resistance type having a non-conductive resistance wire support member in turn connecting to a mounting body portion, a resistance wire detector element mounted on said support member and having an electrical resistance variable with temperature, and connector wires through said mounting body portion to said element from terminals on said body portion, the improved detector construction for low temperature cryogenic service, which comprises, in combination, as said non-conductive resistance wire support member a hollow, non-porous glass rod member, open at the lower end thereof, and having a coefficient of expansion substantially equal to the metal of the resistance element, a platinum containing resistance wire detector element as the aforesaid resistance wire element mounted onto said hollow glass type rod support member with an overlay of a glass coating capable of providing a resulting substantially crystalline non-hygroscopic covering over said resistance element with a coefficient of expansion compatible with the resistance element and with said glass support member, the combination of said hollow glass rod member, resistance element and glass coating being open to direct contact with a cryogenic fluid.

2. The temperature detector of claim 1 further characterized in that said resistance wire detector element is formed of a platinum ribbon.

3. The temperature detector of claim 2 still further characterized in that the connector wires through said mounting body portion in addition to said detector element comprise platinum ribbon.

4. The temperature detector of claim 1 further characterized in that said glass coating over said detector element and said glass-type support member is an annealed non-hygroscopic crystalline covering, resulting from heating to an annealing and stress relieving temperature.

5. The temperature detector of claim 1 further characterized in that said glass-type support member is in a hollow tubular form and is positioned within a perforate circumscribing protective body section having open-end passageway means permitting fluid flow into the interior of said support member as well as externally around the said coating thereon.

References Cited

UNITED STATES PATENTS

| | | |
|---|---|---|
| 1,902,427 | 3/1933 | Sawyer. |
| 2,753,247 | 7/1956 | Greanias et al. _____ 338—28 |
| 2,802,925 | 8/1957 | Von Seelen et al. |
| 3,237,139 | 2/1966 | Werner _____ 338—28 |

REUBEN EPSTEIN, *Primary Examiner.*

U.S. Cl. X.R.

73—362; 338—229